United States Patent [19]

Fresia

[11] Patent Number: 4,476,517

[45] Date of Patent: Oct. 9, 1984

[54] ALUMINUM ELECTROLYTIC CAPACITOR

[75] Inventor: E. James Fresia, Williamstown, Mass.

[73] Assignee: Sprague Electric Company, North Adams, Mass.

[21] Appl. No.: 540,077

[22] Filed: Oct. 7, 1983

[51] Int. Cl.³ .................... H01G 4/04; H01G 9/00
[52] U.S. Cl. .................................. 361/327; 361/433
[58] Field of Search ............. 361/314, 315, 322, 327, 361/433; 252/567

[56] References Cited

U.S. PATENT DOCUMENTS

| | | | |
|---|---|---|---|
| 2,819,492 | 1/1958 | Cummin et al. | 361/315 |
| 3,138,746 | 6/1964 | Burger et al. | 361/433 |
| 3,346,782 | 1/1967 | Alwitt et al. | 361/433 |
| 3,487,270 | 12/1969 | Alwitt | 361/433 |
| 4,164,779 | 8/1979 | Lauer et al. | 361/433 |
| 4,399,489 | 8/1983 | Ross | 361/433 |

FOREIGN PATENT DOCUMENTS

| | | |
|---|---|---|
| 54-2377 | 2/1979 | Japan . |
| 56-140617 | 11/1981 | Japan . |
| 2041646 | 9/1980 | United Kingdom . |

*Primary Examiner*—Donald A. Griffin

[57] ABSTRACT

An aluminum electrolytic capacitor contains a low-resistivity electrolyte consisting essentially of 6 wt % diammonium adipate, 3 wt % ammonium formate, 16 wt % water, 0.025 to 0.3 wt % ammonium dihydrogen phosphate, 1 to 10 wt % p-nitrobenzoic acid, and the balance, ethylene glycol.

4 Claims, 2 Drawing Figures

ALUMINUM ELECTROLYTIC CAPACITOR

BACKGROUND OF THE INVENTION

This invention concerns an aluminum electrolytic capacitor containing a low-resistivity electrolyte consisting essentially of 6 wt % diammonium adipate, 3 wt % ammonium formate, 16 wt % water, 0.025 to 0.3 wt % ammonium dihydrogen phosphate, 1 to 10 wt % p-nitrobenzoic acid, and the balance, ethylene glycol.

Low-resistivity electrolytes are desirable to impart to the capacitor containing them low equivalent series resistance (ESR) at low temperatures, a low ESR ratio (the ratio of ESR at $-40°$ C. to that at room temperature), and low impedance at higher frequenices. If the capacitor is a low-voltage unit, the low-resistivity electrolyte also imparts low ESR at room-temperature.

Formate salts have been added to electrolytes to lower resistivities as formates are highly conductive. However, formates are derived from a fairly strong acid which will attack the dielectric oxide on aluminum foil electrodes. Therefore, formates are generally used with other conducting salts.

Water is frequently added to electrolytes to reduce resistivity in addition to aiding in the reformation of aluminum electrodes during capacitor use. Historically, however, large amounts of water were avoided as capacitor stability was impaired, and if even a few ppm of choride were present dielectric oxide could not be reformed and aluminum corrosion was accelerated.

SUMMARY OF THE INVENTION

It is a feature of this invention to provide a stable capacitor containing a low-resistivity electrolyte of about 100 ohm-cm consisting essentially of 6 wt % diammonium adipate, 3 wt % ammonium formate, 16 wt % water, 0.025 to 0.3 wt % ammonium dihydrogen phosphate, 1 to 10 wt % p-nitrobenzoic acid, and the balance, ethylene glycol.

The ammonium dihydrogen phosphate and the p-nitrobenzoic acid are both necessary to ensure capacitor stability. The role of the phosphate is to maintain the passivity of the cathode foil so it will not react with water producing hydrogen gas. The role of the p-nitrobenzoic acid is also to prevent gassing. However, in this electroylte system, it also raises the maximum formation voltage which is unusual. Since most low-resistivity electrolytes are used in capacitors for low-voltage service, this latter feature is superfluous in those units.

If both the phosphate and the nitrobenzoic acid are not included, capacitors containing this electrolyte system are subject to early failure. The amount of p-nitrobenzoic acid is not nearly as critical as that of the ammonium dihydrogen phosphate as is indicated by the relative concentrations of each above.

DESCRIPTION OF THE PREFERRED EMBODIMENTS

Figure 1:
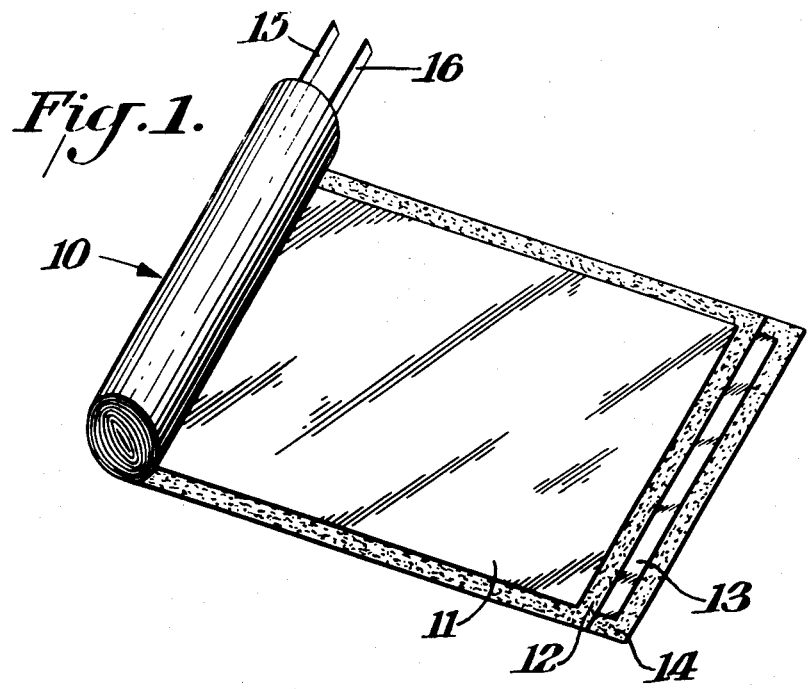
FIG. 1 shows a wound foil capacitor section partially unrolled.

An aluminum electrolytic capacitor has a wound section 10 (shown in FIG. 1 partially unrolled) which has an anode electrode foil 11, bearing a barrier layer dielectric oxide, contiguously wound with a cathode electrode foil 13, which also may bear a dielectric oxide layer, and interleaved spacers 12 and 14. Electrode tab 15 is electrically connected to anode foil 11, and electrode tab 16 is electrically connected to cathode foil 13.

Figure 2:
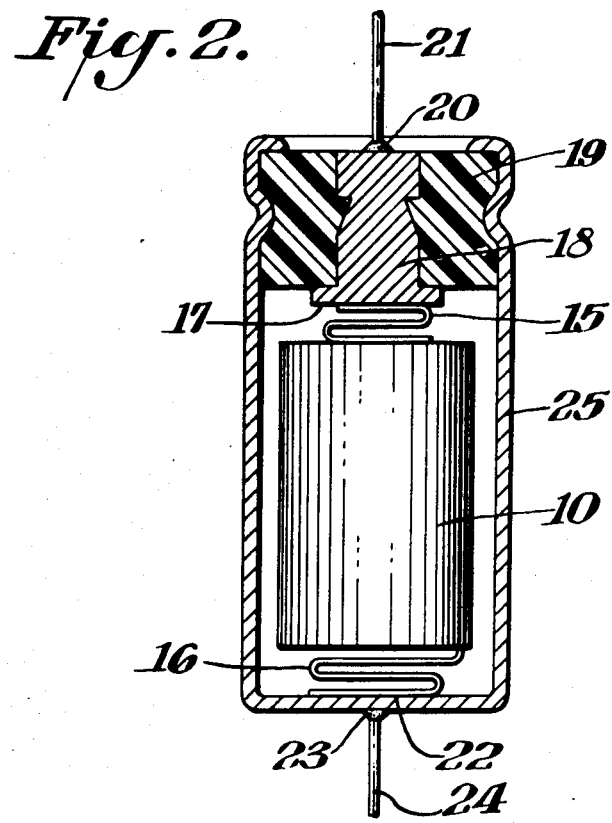
FIG. 2 is a sectional view of a final capacitor showing the various parts thereof.

In FIG. 2, a finished capacitor is shown in which tabs 15 and 16 extend from opposite ends of section 10. Tab 15 is connected to the bottom of terminal 18 at 17, preferably by welding. Terminal 18 extends through bushing 19, and anode lead 21 is attached to it at 20, preferably by welding. Cathode tab 16 is connected to the inside of metal container 25, preferably by welding, at 22. Cathode lead 24 is electrically connected to the outside of container 25 at 23, again preferably by welding, to provide an external cathode lead. Container 25 has been rolled over gasket 18 to seal the unit. Section 10 is impregnated with the electrolyte of the present invention.

This electrolyte consists essentially of 6 wt % diammonium adipate, 3 wt % ammonium formate, 16 wt % water 0.025 to 0.3 wt % ammonium dihydrogen phosphate, 1 to 10 wt % p-nitrobenzoic acid, and the balance, ethylene glycol to provide a low-resistivity electrolyte which imparts low equivalent series resistance (ESR) at low temperatures to the capacitor, low impedance at high frequency, and a low ESR ratio.

EXAMPLE 1

In this example, the benefits obtained by the presence of ammonium dihydrogen phosphate and p-nitrobenzoic acid in the electrolyte are shown. Life test results are given for 6.3V and 100V units tested at rated capacity for 2000 hrs at 85° C. in terms of capacitance in $\mu F$, percent dissipation factor, DC leakage current (DCL) in $\mu A$, and the number of failures with respect to the number of units tested as a ratio.

Electrolyte A is a known commercial electrolyte containing 6 wt % diammonium adipate, 3 wt % ammonium formate, 16 wt % water, and 75 wt % ethylene glycol. Electrolyte B contains the same amount of adipate, formate and water as A plus 4 wt % p-nitrobenzoic acid and 71 wt % ethylene glycol. Electrolyte C, the electrolyte of the present invention, contains the same amount of adipate, formate, water and nitrobenzoate as B plus 0.1 wt % ammonium dihydrogen phosphate, and 70.9 wt % ethylene glycol.

TABLE 1

|  | 6.3 V test | | | 100 V test | | |
| --- | --- | --- | --- | --- | --- | --- |
|  | A | B | C | A | B | C |
| Cap., initial | 108.1 | 108.3 | 108.5 | 4.50 | 4.47 | 4.46 |
| final | * | 96.9 | 94.5 | * | 4.47 | 4.41 |
| % DF, initial | 11.8 | 11.1 | 11.4 | 1.46 | 1.46 | 1.50 |
| final | * | 11.0 | 11.3 | * | 1.91 | 1.46 |
| DCL, initial | 0.73 | 0.66 | 1.1 | 0.43 | 0.30 | 0.54 |
| final | * | 0.06 | 0.11 | * | 0.03 | 0.02 |
| Failures | 30/30 | 2/30 | 0/30 | 30/30 | 4/30 | 0/34 |

*all failed within 500 hrs.

Thus, it can be seen that the presence of both ammonium dihydrogen phosphatee and p-nitrobenzoic acid improve dissipation factor results and decrease the number of failures to provide a stable capacitor.

EXAMPLE 2

The criticality of the amount of ammonium dihydrogen phosphate in providing good shelf stability (storage stability) is shown in this example. The ratio of capacitance before and after storage at 85° C. for 500 hrs equal to the ratio of the time in seconds to reach rated voltage before and after storage multiplied by a shelf factor. A shelf factor of 1 would be perfect; normally shelf factors of 3 to about 8 are acceptable. The electrolyte contained 6 wt % diammonium adipate, 3 wt % ammonium formate, 16 wt % water, 4 wt % p-nitrobenzoic acid, 0 to 0.4 wt % ammonium dihydrogen phosphate (ADP) and the balance, ethylene glycol. Units rated at 6.3 V were tested.

TABLE 2

| ADP, wt % | 0.0 | 0.1 | 0.2 | 0.3 | 0.4 |
|---|---|---|---|---|---|
| Shelf factor | 1.3 | 2.9 | 8.5 | 16.6 | 24.4 |

As seen from this table, shelf stability decreases with increasing concentrations of ammonium dihydrogen phosphate. While the best shelf stability is found with no ADP, capacitors do not perform as well on bias life tests without it as shown in Table 1. Experimentation has shown that 1 to 10 wt % p-nitrobenzoic acid and 0.025 to 0.3 wt % ADP can be used; the preferred values are 4.0 wt % p-nitrobenzoic acid and 0.1 t 0.2 wt %, specifically 0.1 wt %, ammonium dihydrogen phosphate.

What is claimed is:

1. An aluminum electrolytic capacitor comprising a pair of aluminum electrode foils, at least one of which having a barrier layer dielectric oxide layer thereon, said foils being contiguously wound with interleaved spacer material and in contact with a low-resistivity electrolyte consisting essentially of 6 wt % diammonium adipate, 3 wt % ammonium formate, 16 wt % water, 0.025 to 0.3 wt % ammonium dihydrogen phosphate, 1 to 10 wt % p-nitrobenzoic acid and the balance, ethylene glycol.

2. A capacitor according to claim 1 wherein the concentration of said p-nitrobenzoic acid is 4.0 wt %.

3. A capacitor according to claim 1 wherein the concentration of said ammonium dihydrogen phosphate is 0.1 to 0.2 wt %.

4. A capacitor according to claim 3 wherein said concentration is 0.1 wt %.

* * * * *